United States Patent [19]
Gebauer

[11] Patent Number: 5,415,235
[45] Date of Patent: May 16, 1995

[54] CAM LOCKING COUPLER SYSTEM

[75] Inventor: Thomas E. Gebauer, Dubuque, Iowa

[73] Assignee: JRB Company, Inc., Akron, Ohio

[21] Appl. No.: 171,334

[22] Filed: Dec. 21, 1993

Related U.S. Application Data

[63] Continuation of Ser. No. 39,695, Mar. 29, 1993, abandoned, which is a continuation of Ser. No. 928,699, Aug. 11, 1992, abandoned, which is a continuation of Ser. No. 597,194, Oct. 12, 1990, abandoned.

[51] Int. Cl.⁶ .......................... F02F 3/00; A01B 51/00
[52] U.S. Cl. ..................................... 172/273; 37/468; 37/231; 414/723; 172/272
[58] Field of Search .............. 74/567, 582, 568 R; 403/322; 37/231, 234, D12, 468; 292/341.16, 201; 172/272, 273; 414/723, 724

[56] References Cited
U.S. PATENT DOCUMENTS

| | | | |
|---|---|---|---|
| 3,716,159 | 2/1973 | Papasideris et al. | 74/582 |
| 3,760,883 | 9/1973 | Birk | 34/231 |
| 3,818,551 | 6/1974 | Coughran, Jr. | 172/272 |
| 4,452,560 | 6/1984 | Coyle et al. | 172/273 |
| 4,708,579 | 11/1987 | Baird et al. | 172/272 |
| 4,944,628 | 7/1990 | Hulden | 403/322 |
| 4,986,722 | 1/1991 | Kaczmarczyk et al. | 172/272 |

FOREIGN PATENT DOCUMENTS

| | | | |
|---|---|---|---|
| 0216635 | 7/1962 | Sweden | 414/723 |
| WO83/03629 | 10/1983 | WIPO | 414/723 |

Primary Examiner—Carl D. Friedman
Assistant Examiner—Winnie Yip
Attorney, Agent, or Firm—Renner, Kenner, Greive, Bobak, Taylor & Weber

[57] ABSTRACT

A coupler is provided for implementation with front end loaders. A male face plate is connected to the arms of the front end loader, having spring biased and hydraulically released cams on the back surface thereof and maintained in juxtaposition to an aperture passing through the base plate. A female coupler portion is attached to an appropriate implement. The female coupler portion includes a pair of ribs having hooks at the top thereof for engaging the bridge pins of the male portion, and legs having cam pins extending from bottom portions of the ribs. The legs and cam pins pass through the aperture of the faced plate to make locking engagement with the cams.

8 Claims, 2 Drawing Sheets

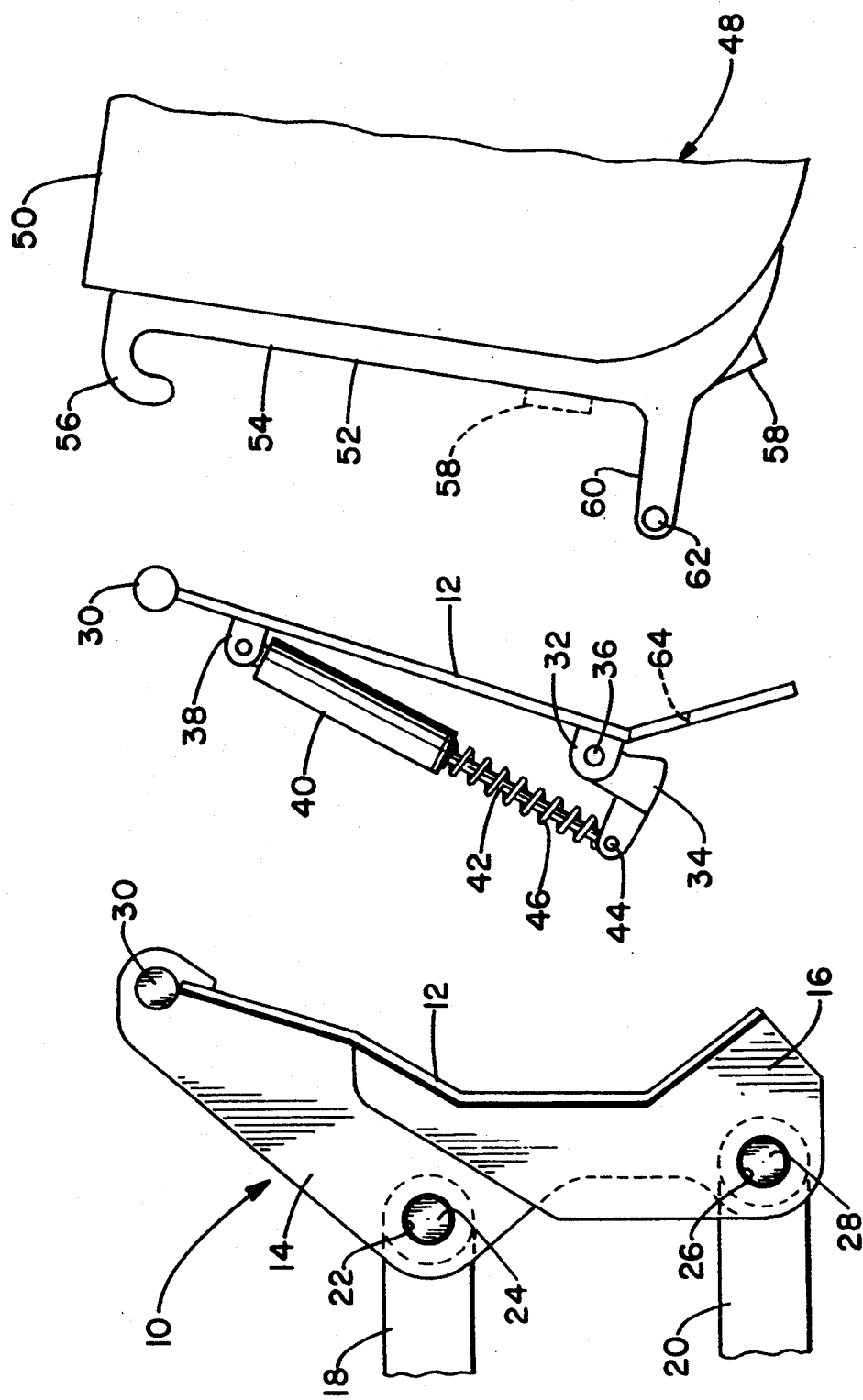

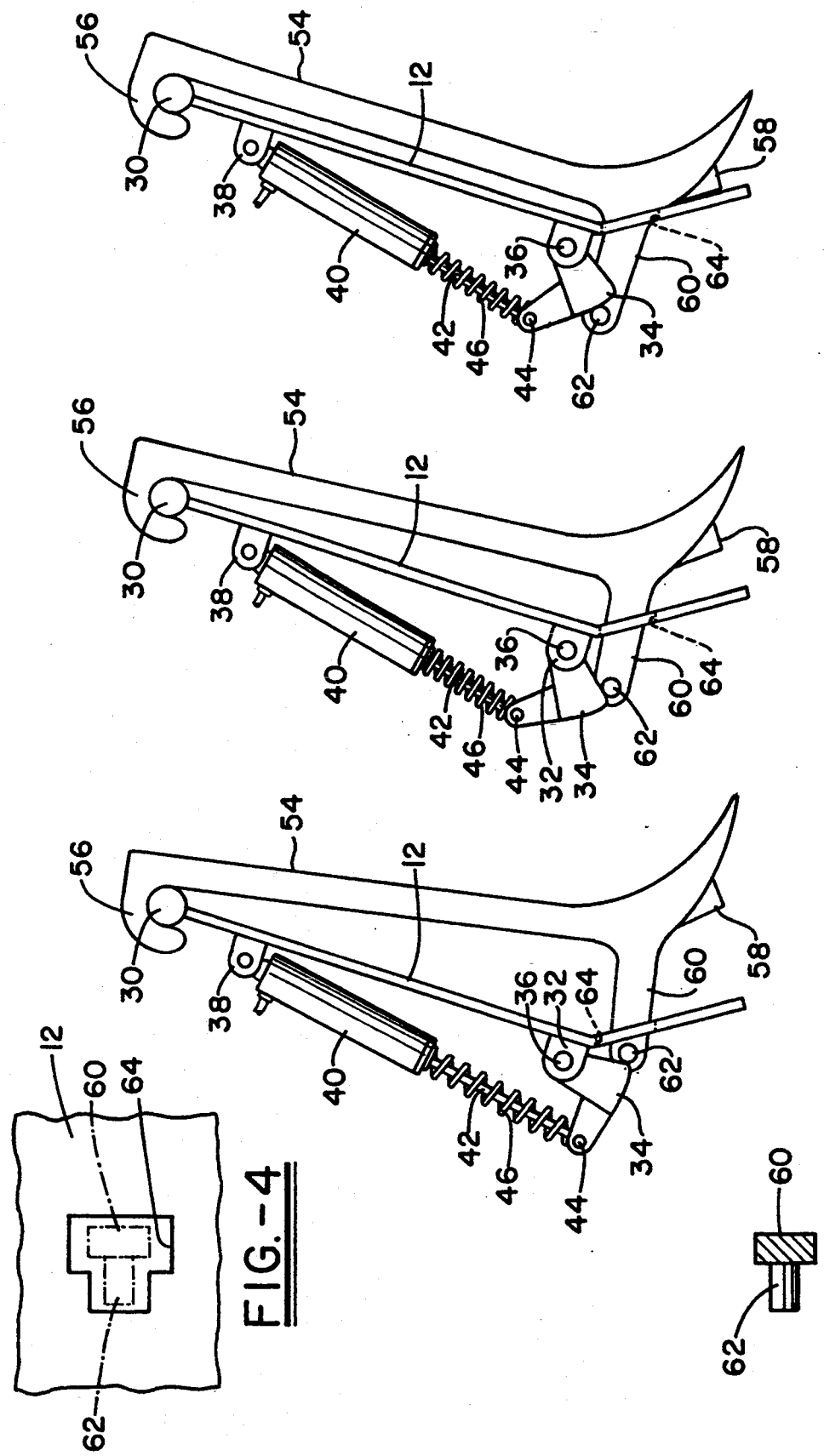

CAM LOCKING COUPLER SYSTEM

This is a continuation of application Ser. No. 08/039,695, filed Mar. 29, 1993, which is a continuation of application Ser. No. 07/928,699, filed Aug. 11, 1992, which is a continuation of application Ser. No. 07/597,194, filed Oct. 12, 1990, all of which are abandoned.

TECHNICAL FIELD

The invention herein resides in the art of coupler systems of the type used for interconnecting implements with a power source such as a front end loader. Particularly, the invention relates to a coupler in which cams achieve the desired locking engagement between the implement and the power source.

BACKGROUND ART

It is well known that front end loaders may be used for a multiplicity of purposes depending upon the attachment or implement employed. In effect, the front end loader serves as a power source adapted for powering or driving buckets, forks, plows, scoops, and various other types of implements. As is well known in the art, such implements are removably interconnected to the front end loader by means of an appropriate coupler. The versatility and efficiency of the front end loader and the various attachments is known to be a function of the coupler employed. It is most desirable that the implement be readily engaged and disengaged with the front end loader in such a manner that, once engaged, the implement operates as though it were directly attached to the front end loader with little or no loss of performance or productivity being experienced as a result of the presence of the coupler.

Previously, a large number of coupler systems have been known for interconnecting implements with front end loaders. The present standard for "quick couplers" is set forth in U.S. Pat. No. 4,708,579 assigned to JRB Company, Inc. of Akron, Ohio, the assignee of the instant application. It is also known in the art to employ a cam lock type of coupler. Neither of these prior art systems provide a coupler which is both self tightening and self adjusting. It is well known that slack is present within a coupler as a result of manufacturing tolerances and the wear which results from use. Coupling pins, holes, stop blocks, and the like which are presented between the male and female portions of the coupler tend to wear with use. Such wear reduces the effectiveness and efficiency of the coupler system and, upon reaching an excessive level, requires replacement of the coupler or repair of portions thereof.

Even the prior art cam lock couplers are complex in design and implementation, resulting in an increase in costs and a reduction in efficiency. Such cam lock systems are also given to wear and alignment problems as presented above. In like manner, couplers made according to the aforementioned patent, while providing the most efficient systems presently available, are also given to wear and resulting alignment problems.

It is recognized that there is a need in the art for a coupler system for front end loaders which is self tightening and self adjusting, automatically compensating for wear and manufacturing tolerances within the coupler system. There is a further need for a coupler which provides multiple points of load bearing contact spaced apart within the coupler system to receive and bear the load transmitted thereto. In other words, the heavy loads passing from the implement to the front end loader arms must necessarily pass through the coupler system. It is most desirable that such forces be passed through a multiplicity of points, diminishing the load at any particular point, assuring the maintenance of system integrity. There is further a need in the art for a coupler system in which forceful engagement between the male and female portions of the coupler are continuously urged by a mechanical biasing means, disengagement of the coupler necessitating the application of manual, pneumatic, or hydraulic force.

SUMMARY OF INVENTION

In light of the foregoing, it is a first aspect of the invention to provide a cam locking coupler system in which engagement of the coupler is achieved through a bias spring constantly urging such engagement.

A further aspect of the invention is the provision of a cam locking coupler system in which disengagement of the coupler is achieved through a hydraulically or manually actuated plunger.

Yet a further aspect of the invention is the provision of a cam locking coupler system which is self adjusting to compensate for wear and manufacturing tolerances.

Still a further aspect of the invention is the provision of a cam locking coupler system which is self aligning.

An additional aspect of the invention is the provision of a cam locking coupler system which is self tightening.

Still another aspect of the invention is the provision of a cam locking coupler system which provides for multiple points of contact and engagement between coupler areas for bearing of force loads.

Yet an additional aspect of the invention is the provision of a cam locking coupler system which is reliable and durable in operation, while being easy to construct and maintain.

The foregoing and other aspects of the invention which will become apparent as the detailed description proceeds are achieved by a coupler for a front end loader, comprising: a male master portion having a contoured face plate and a bridge pin at a top end thereof, said face plate having an opening therein; a cam, pivotal about a pivot pin, in juxtaposition to said opening; and a female portion having a rib adapted for connection to an implement, said rib having a cam pin thereon passing through said opening and engaging said cam.

Other aspects of the invention which will become apparent herein are attained by a coupler interconnecting an implement with the arms of a front end loader, comprising: a face plate operatively interconnected to the arms of the front end loader, said face plate having an aperture passing therethrough; a rib attached to a back surface of the implement and having a cam pin extending therefrom, said cam pin passing through said aperture; and a cam connected by a pivot pin to said face plate at said aperture, said cam operatively interconnecting said cam pin.

DESCRIPTION OF DRAWINGS

For a complete understanding of the objects, techniques and structure of the invention reference should be made to the following detailed description and accompanying drawings wherein:

FIG. 1 is a side view of the male portion of the coupler system of the invention with the same being shown in interconnection with the upper and lower pairs of arms of a from end loader;

FIG. 2 is an illustrative side view of the face plate of the male portion of the coupler and the cam system thereof;

FIG. 3 is an illustrative view of the female coupler portion of the invention;

FIG. 4 is a partial sectional view of the face plate of the male coupler portion, showing the aperture therethrough for receiving the cam pin of the female coupler portion;

FIG. 5 is a front perspective view of the cam pin of the female coupler portion of the invention;

FIG. 6 is an illustrative side view showing initial engagement between the male and female portions of the coupler system, and particularly showing initial engagement of the cam with the cam pin;

FIG. 7 is an illustrative view of the cam and cam pin engagement during the mating of the male and female portions of the coupler, showing the cam pin lifting the cam; and FIG. 8 is an illustrative view of the cam and cam pin engagement in the locked position, with the male and female portions of the coupler in mated engagement and contact.

BEST MODE FOR CARRYING OUT THE INVENTION

Referring now to the drawings and more particularly FIG. 1, it can be seen that the male master portion of a coupler according to the invention is designated generally by the numeral 10. The male portion 10 includes a face plate 12 which is contoured to mate with the ribs of a female coupler in a manner known in the art. Preferably, the face plate 12 is of heavy metal fabrication to withstand the forces operatively imparted thereto. A channel plate 14 connects to and extends rearwardly from the face plate 12. It will be appreciated by those skilled in the art that typically a pair of channel plates 14 would be provided in parallel arrangement, the side view of the illustration of FIG. 1 allowing for the presentation of only one such plate. In like manner, a reinforcing plate 16 is shown extending from the back of the face plate 12 at an outer lower surface thereof. Typically, a pair of parallel reinforcement plates 16 would be provided, with the pair of channel plates 14 being maintained therebetween.

A pair of upper arms 18 and a pair of lower arms 20 extend from a suitable power source such as a front end loader for interconnection with the male portion 10 of the coupler. As will be appreciated by those skilled in the art, a hole 22 is provided within each of the channel plates 14 for purposes of receiving a hinge pin 24 to interconnect each of the upper arms 18 to a respective one of the channel plates 14. Pivotal interconnection is attained by means of the hinge pins 24. In like manner, a hole 26 is provided in each of the reinforcing plates 16 for receiving hinge pins 28 for respectively hingedly securing one of the lower arms 20 thereto. Accordingly, the male portion 10 is hingedly connected to the pairs of arms 18, 20 for manipulation by the front end loader in standard fashion.

As is also shown in FIG. 1, a bridge pin 30 extends from the channel plate 14 at the top edge portion of the face plate 12 for purposes of mating with a hook on the female coupler portion as is well known to those skilled in the art and discussed in further detail below. It will be appreciated that a single bridge pin 30 may be provided, spanning the distance between the channel plates 14, or a pair of such bridge pins 30 may be provided extending from a respective channel plate 14 to a support bracket or the like. It will, of course, be appreciated that interconnections between and among the plates 12, 14, 16 and the bridge pin 30 may be readily achieved by weldments or other appropriate means.

With reference now to FIG. 2, an illustrative schematic of the male portion of the coupler may be seen. As shown, a bracket 32 is welded or otherwise affixed to the back of the face plate 12 and is adapted to pivotally receive a cam 34 by means of a pivot pin 36. In like manner, a bracket 38 is welded or otherwise affixed to the back of the face plate 12 above and in alignment with the bracket 32. A hydraulic cylinder 40 is hingedly pinned to the bracket 38. A piston is received within the hydraulic cylinder 40 at one end thereof, the piston shaft end 42 being hingedly connected to the cam 34 by a pivot pin at a bracket 44. An appropriate coil spring 46 is maintained about the piston shaft 42, urging the cam 34 downwardly and away from the cylinder 40 and bracket 38. It will, of course, be appreciated that a pair of cam and piston assemblies 32-46 would be provided on the back surface of the face plate 12 in spaced apart relationship to each other.

With reference now to FIG. 3, it can be seen that an implement attachment contemplated for employment with the instant invention is designated generally by the numeral 48. An implement 50, such as a shovel, scoop, fork or the like is shown partially broken away and connected at the rear thereof to a female coupler portion 52. As shown, the female portion 52 comprises a rib 54 attached to the back of the implement 50 as by weldments or the like. Typically, a pair of substantially identical ribs 54 would be presented on the back of the implement, spaced apart a distance equivalent to the spacing between the cam and cylinder assemblies 32-46 presented above with respect to the male coupler portion as shown in FIG. 2. The rib 54 includes a hook 56 at the top thereof adapted for receiving the bridge pin 30 at the top of the face plate 12. A support plate 58 is welded or otherwise formed at the bottom of the rib 54 for engagement with a face surface of the face plate 12, serving as a load bearing member.

A leg 60 is integral with and extends rearwardly from the rib 54. A cam pin 62 extends from and is normal to the plane of the leg 60 and, accordingly, the plane of the rib 54. As will be presented below, the cam pin 62 is adapted for engagement with the cam 34. As presented above, a support plate 58 may be positioned at the bottom of the rib 54 as a load bearing member. It has also been found that the plate 58 may be positioned on the rib 54 above the leg 60, as shown in phantom, to serve the same function.

As shown in FIG. 4, the face plate 12 has an aperture 64 passing therethrough and in juxtaposition with the cam 34. Of course, a pair of such apertures 64 would typically be provided in the face plate 12, one in association with each of the cams 34. As shown in FIG. 5, the leg 60 and cam pin 62 form a "T" configuration which corresponds to, but is slightly smaller than, the aperture 64. Accordingly, the leg 60 and cam pin 62 may pass through the aperture 64 and into engagement with the cam 34 in a manner to be discussed directly below. It will be appreciated by those skilled in the art that the aperture 64 need only be of such size and configuration to accommodate the passage of the leg 60 and cam pin 62 therethrough. Accordingly, the concept of the invention extends to split cams extending from opposite sides of the leg 60 and other such modifications.

With reference now to FIGS. 6–8, illustrative schematic views of the engagement of the male coupler portion 10 with the female coupler portion 52 may be seen. It will be appreciated that the male portion 10 is connected to the pairs of upper and lower arms 18, 20 as discussed above and shown in FIG. 1. The bridge pin or pins 30 are placed beneath and inserted into the hooks 56 of the ribs 54. As the coupler is lifted, the weight of the implement attachment 48 causes the female rib 54 to move toward the face plate 12, with the leg 60 and pin 62 passing through the aperture 64. The cam pin 62 engages a surface of the cam 34 as shown in FIG. 6, deflecting the cam 34 against the urging of the spring 46 as shown in FIG. 7 until the end of the cam 34 passes beyond the line interconnecting the centers of the pivot pin 36 and cam pin 62 to fall into the locked position shown in FIG. 8. The urging of the bias spring 46 maintains the cam 34 in this locked position against the pin 62 during operation of the front end loader employing the implement 48.

Disengagement of the implement 48 from the front end loader is easily achieved by simply actuating the hydraulic cylinder and piston 40, 42, retracting the piston within the cylinder and thereby compressing the spring 46, lifting the cam 34 from engagement with the pin 62. The pairs of arms 18, 20 then lower the implement attachment 48 to the ground or other support surface, allowing the leg 60 and cam pin 62 to be retracted from the aperture 64, while also allowing the bridge pin or pins 30 to be removed from the hooks 56. Another implement may then be attached in the manner discussed above.

It will be readily appreciated by those skilled in the art that the force bearing points of the coupler just described are spaced in such a manner as to evenly distribute the load transmitted therethrough. Vertical weight is supported at the bridge pins and hooks 30, 56 at the top of the assembly, while three load bearing points are uniquely provided at the bottom. It will be appreciated by those skilled in the art that the pivot pin 36, cam pin 62, and support plate 58 are all provided to withstand forces imparted thereto and transmitted thereby during utilization of the implement. The movement of the end of the cam 34 beyond the line interconnecting the pins 36, 62 assures a locked engagement at the bottom portion of the coupler, the same being consistently and constantly urged by the biasing of the spring 46.

It will, of course, be readily appreciated by those skilled in the art that the hydraulic cylinder and piston 40, 42 could be replaced by a mechanical lever arm adapted for releasing the force of the spring 46. Additionally, the cylinder, piston and spring assembly 40, 42, 46 could be modified by eliminating the spring 46 and replacing the piston and cylinder 42, 40 with a double acting cylinder in which the locking force is hydraulically applied and maintained, as well as released. Such a system requires continued application of hydraulic pressure during use of the implement 50, and allows for possible disengagement of the implement 50 upon loss of hydraulic pressure. In contradistinction, a system employing the spring 46 with the cylinder and piston 40, 42 assures constant forceful engagement between the arm 34 and pin 62 which continuously tightens and self-adjusts during use and wear. Such engagement is also independent of any hydraulic system. It will also be appreciated that various modifications and changes to the embodiments presented will be conceived by those skilled in the art, while remaining within the confines of the invention.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A coupler for a front end loader, comprising:
a male master portion having a contoured face plate and a bridge pin at a top end thereof, said face plate having an opening therein;
a pivot pin of circular cross section affixed to said male master portion;
a cam received by and pivotal about said pivot pin in juxtaposition to said opening; and
a female portion having a rib adapted for connection to an implement, said rib having a cam pin thereon passing through said opening and engaging said cam, said cam pin extending orthogonally from said rib, said rib having a support plate extending from said rib for contacting engagement with said face plate, engagement of said cam with said cam pin urging said support plate onto said face plate, said pivot pin, cam pin, and support plate providing forceful interengagement between said male master portion and said female portion at respective lower ends of said portions, and said male master portion having spring means to engage said cam for asserting constant forceful engagement between an arcuate cam surface of said cam and said cam pin, thereby constantly tightening and self-adjusting said interengagement of said male master and female portions during use and wear.

2. The coupler according to claim 1, further comprising first means in engagement with said cam for releasing said cam from said engagement with said cam pin.

3. The coupler according to claim 2, wherein said first means comprises a hydraulic piston.

4. The coupler according to claim 1, wherein said rib has a hook at a top end thereof for engagement with said bridge pin, said bridge pin and hook providing forceful interengagement of said male master portion and said female portion at respective upper ends thereof.

5. A coupler for interconnecting an implement with the arms of a front end loader, comprising:
a face plate operatively interconnected to the arms of the front end loader, said face plate having an aperture passing therethrough;
a rib adapted to be attached to a back surface of the implement, said rib having a top portion, a bottom portion, and a leg extending from said bottom portion and a cam pin extending orthogonally from said leg, said cam pin passing through said aperture;
a cam connected by a pivot pin of circular cross section to said face plate adjacent said aperture, said cam operatively engaging said cam pin; and
a support plate extending from said bottom portion of said rib for engaging said face plate, and wherein said support plate, pivot pin, and cam pin provide forceful interengagement between said face plate and said rib at respective bottom portions thereof at a locking position between said cam and said cam pin, and said rib having spring means to engage said cam for asserting constant forceful engagement between an arcuate cam surface of said cam and said cam pin, thereby constantly tightening and self-adjusting said interengagement of said face plate and rib during use and wear.

6. The coupler according to claim 5, further comprising release means connected to said cam for selectively releasing said cam from engagement with said cam pins.

7. The coupler according to claim 6, wherein said release means comprises a hydraulic piston.

8. The coupler according to claim 6, wherein said face plate has a bridge pin at a top edge thereof in forceful engagement with a hook at a top edge of said rib.

* * * * *